(12) United States Patent
Yasuno et al.

(10) Patent No.: US 6,442,194 B1
(45) Date of Patent: Aug. 27, 2002

(54) DIGITAL TELEPHONE TRANSMITTER/RECEIVER

(75) Inventors: Yoshinobu Yasuno, Tokyo (JP); Yasuhiro Riko, 1988-34, Kita Hassaku-cho, Midori-ku, Yokohama-shi, Kanagawa-ken 226-0021 (JP)

(73) Assignees: Matsushita Electric Industrial Co., Ltd., Osaka (JP); Yasuhiro Riko, Kanagawa Ken (JP)

(*) Notice: Subject to any disclaimer, the term of this patent is extended or adjusted under 35 U.S.C. 154(b) by 0 days.

(21) Appl. No.: 09/455,317

(22) Filed: Dec. 6, 1999

(51) Int. Cl.$^7$ ............................... H04B 1/38; H04R 1/02
(52) U.S. Cl. ....................... 375/219; 381/345
(58) Field of Search .................. 375/219; 381/162, 381/345, 370, 328, 317, 56, 57; 379/78

(56) References Cited

U.S. PATENT DOCUMENTS

| | | | |
|---|---|---|---|
| 5,680,467 A | * 10/1997 | Hansen | 381/312 |
| 5,721,783 A | * 2/1998 | Anderson | 381/312 |
| 5,917,921 A | * 6/1999 | Sasaki et al. | 381/92 |
| 5,953,431 A | * 9/1999 | Yashima et al. | 381/103 |

* cited by examiner

Primary Examiner—Chi Pham
Assistant Examiner—Khai Tran
(74) Attorney, Agent, or Firm—Louis Woo

(57) ABSTRACT

An acoustic pulse in size corresponding to the digit position of a digital signal pulse is generated by means of condenser speakers $26_1$, $26_2$, ... $26_n$, that are grouped electro acoustic transducer elements corresponding to each bit that forms a digital signal employed in a communication channel. Then, an electro acoustic D/A converter for synthesizing the pulse in a cavity 24 is composed. Further, this electro acoustic D/A converter is to be as a component, and an electro acoustic A/D converter is composed by additionally providing electric accessories as in the A/D converter comprising a general electric circuit. In this manner, a transmitter/receiver having a function for converting between an acoustic analog signal and a digital electric signal is composed.

12 Claims, 3 Drawing Sheets

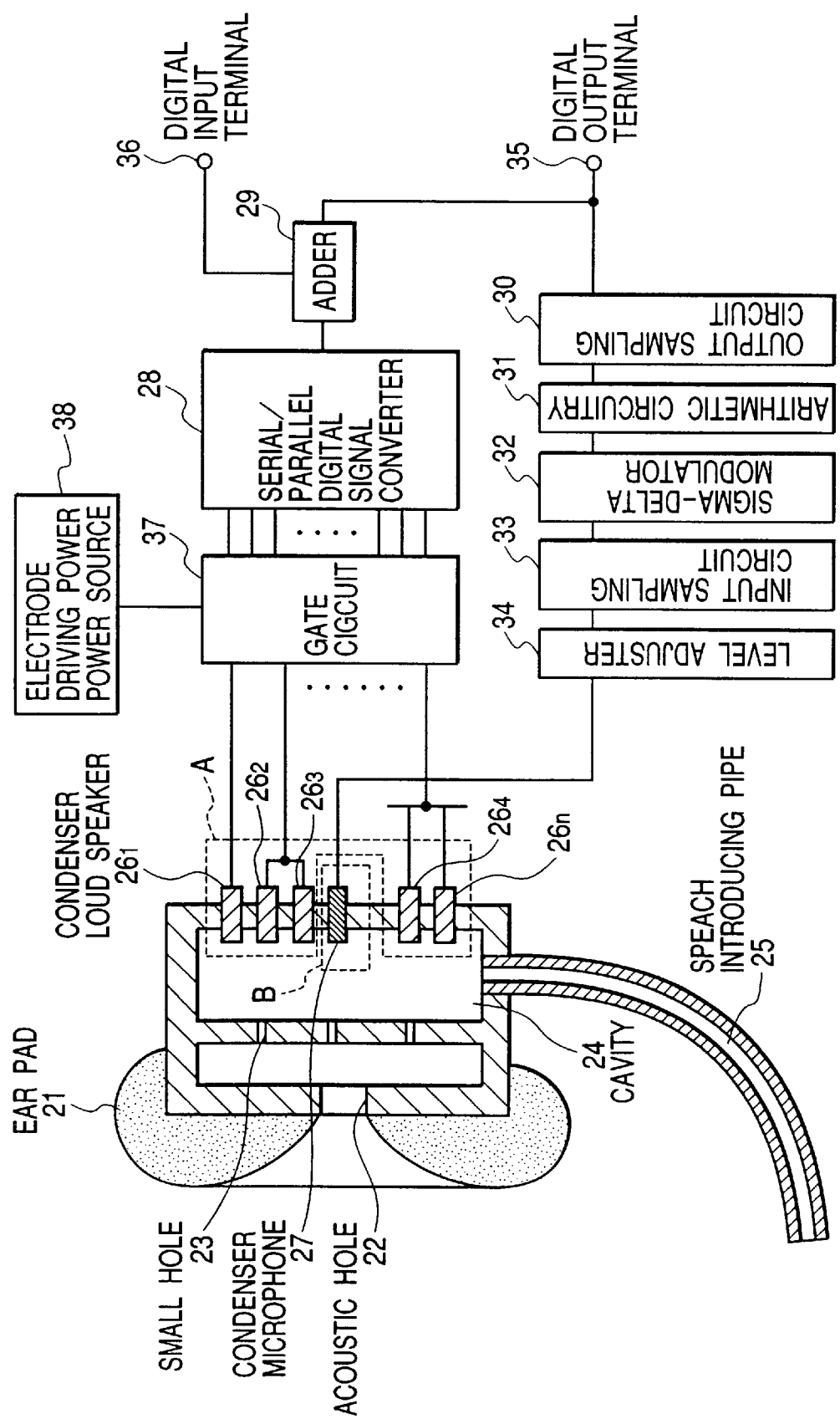

VIBRATION MEMBRANE
41

THROUGH HOLE
42a

42
INSULATION SPACER

CONDUCTIVE FACE
43a

43
GROUPED ELECTRODES

DIGITAL TELEPHONE TRANSMITTER/RECEIVER

BACKGROUND OF THE INVENTION

1. Field of the Invention

The present invention relates to input and/or output part of general information communication equipments, electro acoustic equipments, measuring instruments, and systems handling an analog acoustic signal. In particular, the present invention relates to a digital transmitter/receiver implemented in digital speech communication systems.

2. Description of the Prior Art

Conventionally, speech communication using a digital communication system employed an analog to digital converter to convert from analog speech signal to digital transmission at transmitting side and this is recovered to analog signal by a digital to analog converter to drive loudspeaker or earphone at receiving side.

FIG. 4 is a block diagram depicting a schematic configuration of a conventional digital communication system handing analog signals. On a transmitting side, reference numeral 11 denotes an analog microphone; reference numeral 12 denotes an A/D converter; and reference numeral 13 denotes a digital communication channel. On the receiving side, reference numeral 14 denotes a D/A converter, and reference numeral 15 denotes a loudspeaker or earphone.

In such a conventional communication system, there has been a problem that the system requires plural components such as A/D converter, D/A converter, and multiple power supplies annexed thereto, and disturbances such as noise, crosstalk, interference or wiretap in analog signal occurs.

SUMMARY OF THE INVENTION

An object of the present invention is to provide digital transmitter/receiver capable of eliminating problems said above associated with the foregoing analog signal and directly connecting analog speech and digital communication systems with each other.

To achieve the foregoing object, a digital transmitter/receiver generates acoustic pulses in magnitude corresponding to digit positions of the pulses of a digital signal by means of electro acoustic transducer elements corresponding to respective bits that forms a digital signal employed in a communication channel, and synthesizes the pulses in an acoustic field (cavity). In this manner, an electro acoustic D/A converter is composed. As in a general electronic A/D converter, the foregoing electro acoustic D/A converter is to be as a component of an A/D converter. This electro acoustic A/D converter is composed of a subtractor, a comparator, an integrator, a sampling circuit, a serial/parallel converter, and a device annexed thereto. In this manner, a transmitter/receiver having a function for converting an analog acoustic signal to a digital electric signal is composed.

BRIEF DESCRIPTION OF THE DRAWINGS

The object and features of the present invention will become more readily apparent from the following detailed description taken in conjunction with the accompanying drawings in which:

FIG. 1 is a block diagram depicting a configuration of an electronic circuit portion and a digital input/output portion by cross-sectioning an electro acoustic transducer portion in a digital transmitter/receiver for illustrating a first embodiment of the present invention;

The same or corresponding elements or parts are designated with like references throughout the drawings.

DETAILED DESCRIPTION OF THE INVENTION

Figure 2B:
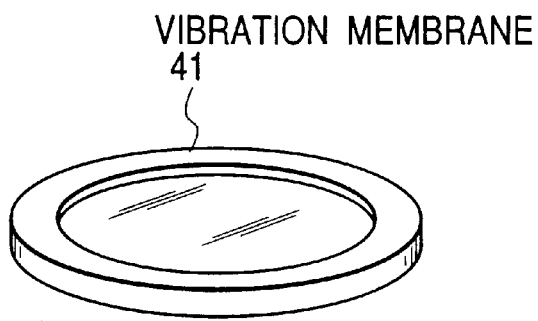
FIG. 2A to FIG. 2D are illustrative views illustrating a configuration of unit A in the electro acoustic transducer portion for illustrating a second embodiment of the present invention.
Figure 2A:
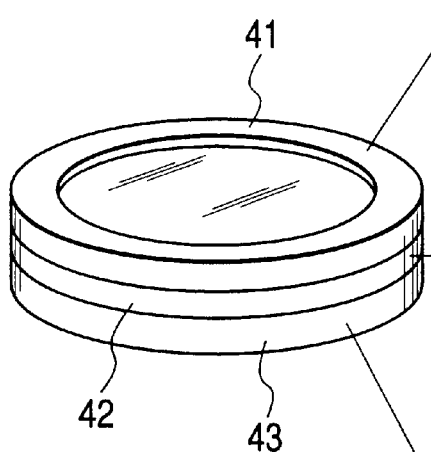
Figure 2C:
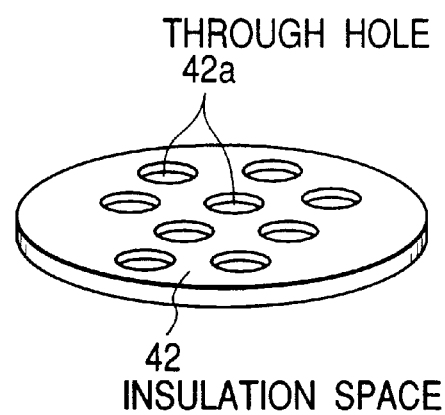
Figure 2D:
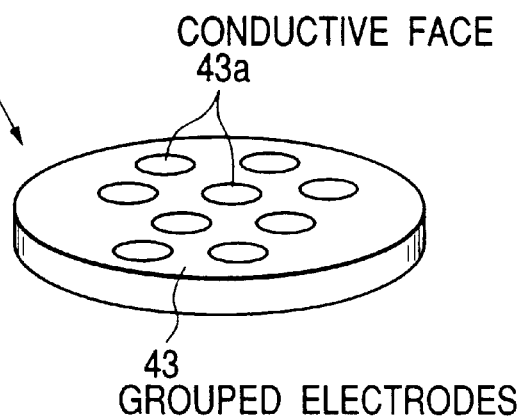

Hereinafter, embodiments of the present invention will be described with reference to the accompanying drawings.

FIG. 1 is a block diagram depicting a configuration of an electronic circuit portion and a digital input/output portion by cross-sectioning an electro acoustic transducer portion in a digital transmitter/receiver for illustrating a first embodiment of the present invention. In the electro acoustic trasducer portion, reference numeral 21 denotes an ear pad for bringing the transmitter/receiver in contact with the user's ear shell; reference numeral 22 denotes an acoustic hole for transmitting an acoustic signal into an ear shell; reference numeral 23 denotes a small hole for outputting only the fundamental part of the analog acoustic signal converted and composed from the digital electric signal in a cavity 24; reference numeral 24 denotes the cavity for generating an analog acoustic signal and mixing acoustic signals to be transmitted therewith; reference numeral 25 denotes a speech introducing pipe for introducing the speech signals to be transmitted; and reference numerals $26_1, 26_2, \ldots, 26_n$ are all the same, and denote a plurality of condenser speakers (acoustic source unit, Hereinafter, referred to as "unit A"); and reference numeral 27 denotes a condenser microphone (receiving sensor unit. Hereinafter, referred to as "unit B").

Further, at the electronic circuit portion and digital input/output portion, reference numeral 28 denotes a serial/parallel digital signal converter; reference numeral 29 denotes an adder; reference numeral 30 denotes an output sampling circuit; reference numeral 31 denotes an arithmetic circuitry; reference numeral 32 denotes a sigma-delta modulator; reference numeral 33 denotes an input sampling circuit; reference numeral 34 denotes a level adjuster; reference numeral 35 denotes a digital output terminal; reference numeral 36 denotes a digital input terminal; reference numeral 37 denotes gate circuits; and reference numeral 38 denotes an electrode driving power source.

An operation of the digital transmitter/receiver having the foregoing configuration will be described here.

The condenser speaker being unit A in the electro acoustic transducer portion and the condenser microphone being unit B are well known, respectively. In the condenser microphone, its output voltage is known to be proportional to displacement of a vibration membrane due to a sound pressure on the vibration membrane and an electret surface potential (or polarizing voltage). In addition, in the condenser speaker, its output sound pressure is proportional to driving force applied to the vibration membrane in electrostatic manner. The magnitude of the driving force is determined depending on a product of the electret surface potential (or polarizing voltage) and a signal voltage supplied from the outside; and the size in area for a driving electrode opposed to the vibration membrane.

Then, units A are grouped into the number of digits configuring digital signal data; and the number of units A is defined at a ratio expressed by the formula (1) below corresponding to the digit positions of respective bits for the digital signal.

$$2^0:2^1:2^2:2^3:2^4: \text{---} = 1:2:4:8:16: \text{---} \quad (1)$$

In the case where the bit exist, connection between a constant voltage electrode driving power source 38 and its unit group is put in "connection" to apply driving force. In this manner, a sound pressure pulse in magnitude conforming to the digital signal value is radiated in the cavity 24. The magnitude of the entire sound pressure in the cavity 24 is expressed by the formula (2):

$$b_0 \cdot 2^0 + b_1 \cdot 2^1 + b_2 \cdot 2^2 + \text{---} \quad (2)$$

wherein $b_0, b_1, b_2 \ldots$ denotes a sign of 0, +1, or −1.

That is, electro-acoustic transduction and digital/analog conversion are performed simultaneously via units A. At this time, when a digital electric signal has a constant voltage for all digit positions and a sufficiently high clock frequency, the frequency characteristics of driving force can be regarded as being flat. In addition, even if a product between a supply voltage for all individual digit positions and the number of units A in group is set based on the foregoing ratio, similar operation is performed.

The size of this cavity 24 is small enough compared with the wavelength of frequency range, and thus, the sound pressure in the cavity can be regarded as being uniform at all positions.

In the foregoing, electro-acoustic digital signal transduction has been described. The thus radiated acoustic signal is mixed with a transmission acoustic signal to be introduced from the outside through the speech introducing pipe 25 in the cavity 24. Then, the mixed signal is detected by means of an detection electrode of unit B installed in the same cavity as unit A, and is transmitted to an ear shell as a receiving speech signal.

The detected acoustic signal is sampled in the time domain by means of the input sampling circuit 33 after its level has been adjusted by means of the level adjuster 34. Then, in the sigma-delta modulator 32, its sample value is compared with the previous sample. In the case where a difference between these values exceeds the a predetermined threshold level, an output pulse of +1 is generated. In the case where the difference negatively exceeds the level, an output pulse of −1 is generated. Further, if the difference is within the threshold level, signal of zero is generated. That is, delta modulation processing is performed.

The thus obtained output of +1, −1, or is regarded as a binary digit, and is supplied to the arithmetic circuitry 31. The arithmetic circuitry 31 cumulatively adds and subtracts the supplied value, and always creates a new digital value.

In the case where no digital electric signal is supplied from the outside as a receiving signal, only those caused by additive vibration force due to the sound pressure applied onto the vibration membrane face of unit B by means of the speech introducing pipe 25 are supplied to the arithmetic circuitry 31 after being detected by means of unit B and processed at each portion. In this case, the sound pressure on the vibration membrane face of unit B applied by transmission speech to be introduced from the outside into the cavity 24 and the synthetic sound pressure radiated from grouped units A through the arithmetic circuitry 31, adder 29, serial/parallel converter 28, and grouped gate circuit 37 are balanced within the range of system error within the voice level, and the sounds inside of the cavity 24 are canceled.

The foregoing error is always added/subtracted so that an output of unit B becomes small in the arithmetic circuitry 31, and thus, within the least significant bit of the digital signal. That is, the output of the arithmetic circuitry 31 is the same as a digitized acoustic signal to be transmitted. In this case, the arithmetic circuitry 31 is operated by means of a high-speed clock that is a multiple of a bit length of a normal digital signal because of its digital modulation characteristics. Thus, this high-speed clock is converted into a normal speed clock by means of the output sampling circuit 30.

In addition, a receiving digital signal incoming from a communication channel is supplied from a digital input terminal 36, and is added to an output of the arithmetic circuit 31 in the adder 29. In this manner, the signal is reproduced and transmitted as an analog signal sound, and an object of communication is achieved.

FIG. 2A to FIG. 2D are illustrative views illustrating a configuration of unit A at an electro acoustic transducer portion for illustrating a second embodiment of the present invention. In these figures, reference numeral 41 denotes a vibration membrane. This membrane is an insulation membrane comprising FEP (phloroethyleneprolylene) resin or the like, and a metal conductor is deposited on its one side face (a top face in this embodiment). Prior to deposition, the conductor is electrically charged by means of corona shower or the like to be an electret. Reference numeral 42 denotes an insulation spacer comprising a thin plate on which through holes 42a are composed; reference numeral 43 denotes grouped electrodes having a plurality of conductive faces 43a composed on an insulation material corresponding to the through holes 42a of the insulation spacer 42. The foregoing vibration membrane 41, insulation spacer 42, and grouped electrodes 43 are laminated each other, thereby forming equivalence to the unit A.

Figure 3:
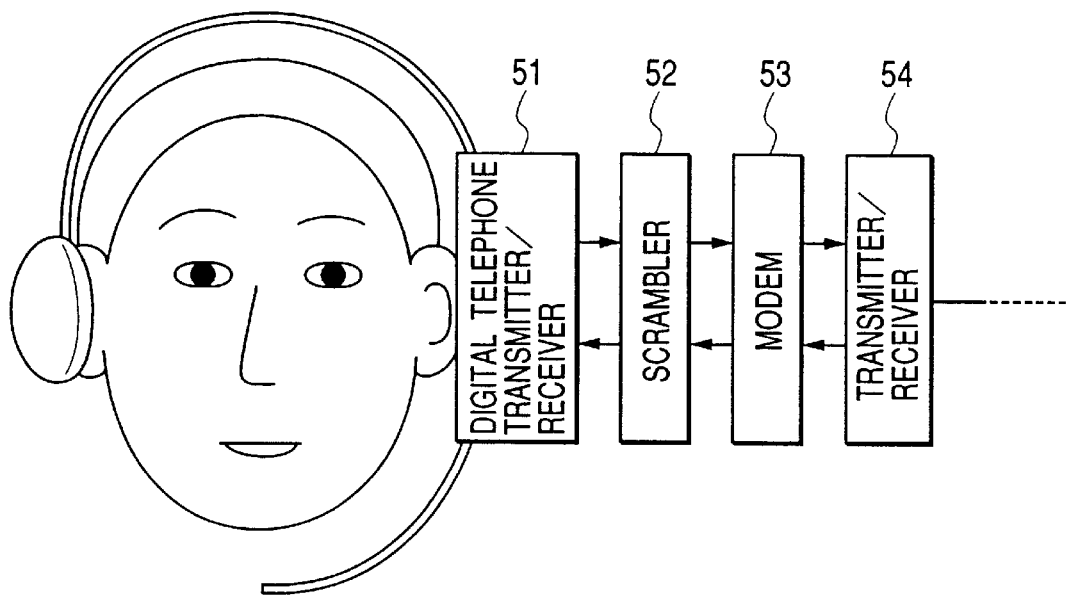
FIG. 3 is an illustrative view illustrating an example of configuring a communication system practically using the transmitter/receiver according to the illustrative embodiment.
Figure 4:
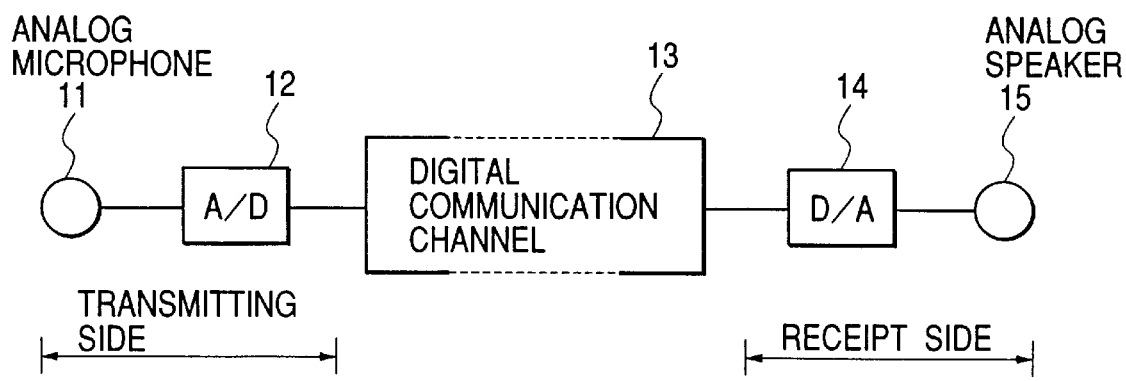
FIG. 4 is a block diagram depicting a schematic configuration of a conventional digital speech communication system.

FIG. 3 is an illustrative view illustrating an example of configuring a communication system practically using the transmitter/receiver according to the illustrative embodiment, wherein reference numeral 51 denotes a digital transmitter/receiver configured according to the illustrative embodiment; reference numeral 52 denotes a scrambler; reference numeral 53 denotes a modem; and reference numeral 54 denotes a wired or wireless transmitter/receiver.

As has been described above, the digital transmitter/receiver of the present invention includes a function for converting between an acoustic analog signal and a digital electric signal; a communication system is completely digitized. Thus, there is provided a very practical effect that scrambler is capable of ensuring a substantially infinitive security function, and capable of functioning as a receiver.

What is claimed is:

1. A digital transmitter/receiver having a conductive vibration membrane, a plurality of acoustic source units comprising an electrostatic driving electrodes installed in facing to the conductive vibration membrane, and a sound receiving sensor unit installed in facing to said conductive vibration membrane, the sensor unit comprising a vibration detection electrode provided with a preamplifier, said digital transmitter/receiver comprising:

an electrode driving circuit in which said acoustic source units are classified as a plurality of groups, the driving electrodes are connected in parallel in these classified groups, the number of groups is distributed so as to be an integer power of 2 corresponding to the digit position of each bit for a digital signal; the electrode driving circuit switching ON/OFF between a driving electrode terminal of the distributed individual groups and an electrode driving power source;

a level adjusting preamplifier for a vibration displacement signal of a vibration membrane obtained from one terminal to which a vibration detection electrode of said receiving sensor unit is connected;

a converter circuit in which an output signal from said level adjusting preamplifier is sampled by means of a constant clock frequency to obtain an input sampling signal; the level is compared with the previous sampling signal; when the comparison result exceeds the predetermined threshold, a pulse of +1 is generated; when it exceeds negatively the predetermined threshold, a sign pulse of −1 is outputted; when it is equal to or smaller than the threshold, a sign pulse of 0 is outputted; the foregoing signs +1, −1, and 0 are regarded as binary values to be cumulatively added; and the resultant binary digits are data-sampled by means of a clock coinciding with an interface to be externally connected to be an output sampling signal;

a converter circuit for converting said output sampling signal to a digital output signal in a predetermined format; and an adder and serial/parallel converter circuit for mixing said digital output signal and external input digital signal with each other, thereby supplying these mixed signals to said electrode driving circuit as an electrode driving signal, wherein a clock signal from said input sampling signal to cumulative addition is set to a frequency twice or more of a clock signal following said output sampling signal, an external analog sound is introduced into a cavity to be mixed, and an acoustic terminal for receiving a sound pressure in the cavity is provided to enable direct reception of the analog acoustic signal and digital electric signal.

2. A digital transmitter/receiver according to claim 1, wherein a product between the number of acoustic source units in said group and a voltage of an electrode driving power source supplied to the individual groups only is set to a power of 2 corresponding to the bit digit position of the digital signal.

3. A digital transmitter/receiver according to claim 1, wherein said acoustic source unit consists of one vibration membrane; a space for dividing a region that can be vibrated on the membrane face in plurality; and a driving electrode installed in parallel to the divided region that can be vibrated.

4. A digital transmitter/receiver according to claim 1, wherein an electret membrane is provided on part or all of the surface opposed to a vibration membrane on said acoustic source unit driving electrode and said electrode for detecting the driving of a sound receiving sensor unit.

5. A digital transmitter/receiver according to claim 1, wherein said vibration membrane is composed of a resin, and a conductive material is deposited to one face of the vibration membrane, thereby providing an electret membrane.

6. A digital transmitter/receiver according to claim 2, wherein said acoustic source unit consists of one vibration membrane; a space for dividing a region that can be vibrated on the membrane face in plurality; and a driving electrode installed in parallel to the divided region that can be vibrated.

7. A digital transmitter/receiver according to claim 2, wherein an electret membrane is provided on part or all of the surface opposed to a vibration membrane on said acoustic source unit driving electrode and said electrode for detecting the driving of a sound receiving sensor unit.

8. A digital transmitter/receiver according to claim 2, wherein said vibration membrane is composed of a resin, and a conductive material is deposited to one face of the vibration membrane, thereby providing an electret membrane.

9. A digital transmitter/receiver according to claim 6, wherein an electret membrane is provided on part or all of the surface opposed to a vibration membrane on said acoustic source unit driving electrode and said electrode for detecting the driving of a sound receiving sensor unit.

10. A digital transmitter/receiver according to claim 6, wherein said vibration membrane is composed of a resin, and a conductive material is deposited to one face of the vibration membrane, thereby providing an electret membrane.

11. A digital transmitter/receiver according to claim 3, wherein an electret membrane is provided on part or all of the surface opposed to a vibration membrane on said acoustic source unit driving electrode and said electrode for detecting the driving of a sound receiving sensor unit.

12. A digital transmitter/receiver according to claim 3, wherein said vibration membrane is composed of a resin, and a conductive material is deposited to one face of the vibration membrane, thereby providing an electret membrane.

* * * * *

UNITED STATES PATENT AND TRADEMARK OFFICE
CERTIFICATE OF CORRECTION

PATENT NO.    : 6,442,194 B1  
DATED         : August 27, 2002  
INVENTOR(S)   : Yoshinobu Yasuno and Yasuhiro Riko Page 1 of 1

It is certified that error appears in the above-identified patent and that said Letters Patent is hereby corrected as shown below:

<u>Title page,</u>
Insert -- Item [30]    Foreign Application Priority Data
                Dec. 7, 1998    (JP) ....................... 10-347268 --

Signed and Sealed this

Sixth Day of May, 2003

JAMES E. ROGAN
*Director of the United States Patent and Trademark Office*